Jan. 19, 1937.  G. T. McCLURE  2,068,342

LOAD BRAKE DEVICE

Filed Oct. 19, 1935

INVENTOR
GLENN T. McCLURE
BY Wm. M. Cady
ATTORNEY

Patented Jan. 19, 1937

2,068,342

UNITED STATES PATENT OFFICE 2,068,342

LOAD BRAKE DEVICE

Glenn T. McClure, McKeesport, Pa., assignor to The Westinghouse Air Brake Company, Wilmerding, Pa., a corporation of Pennsylvania Application October 19, 1935, Serial No. 45,697

15 Claims. (Cl. 303—23)

This invention relates to fluid pressure brakes and more particularly to a fluid pressure brake equipment having means for applying the brakes with greater force on loaded cars than on empty or unloaded cars.

It is the principal object of this invention to provide an improved empty and load fluid pressure brake equipment incorporating means which operates so that the maximum pressure developed in the brake cylinder on a full application of the brakes in empty operation will be substantially less than that on a full application of the brakes during load operation, and in which a proportional pressure will be developed in the brake cylinder on less than a full service brake application.

A further object of the invention is to provide an empty and load brake equipment of the type referred to and in which the volume of the reservoir employed, and the time required to effect the release of the brakes, remains substantially the same when the equipment is conditioned for empty operation as when the equipment is conditioned for load operation.

Another object of the invention is to provide an empty and load brake equipment which is adapted to be controlled by a standard brake controlling valve device without affecting the method or the time of operation of such device.

A further object of the invention is to provide an improved empty and load brake equipment.

Figure 1:
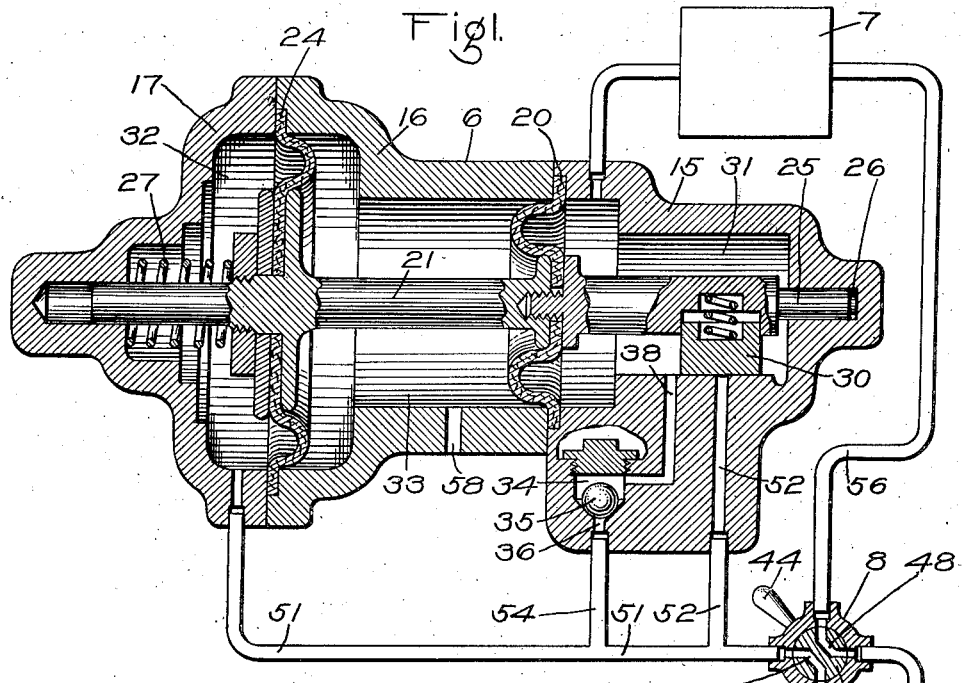

Other objects of the invention and features of novelty will be apparent from the following description taken in connection with the accompanying drawing in which Fig. 1 is a diagrammatic view, partly in section, of a brake equipment embodying my invention.

Figure 2:
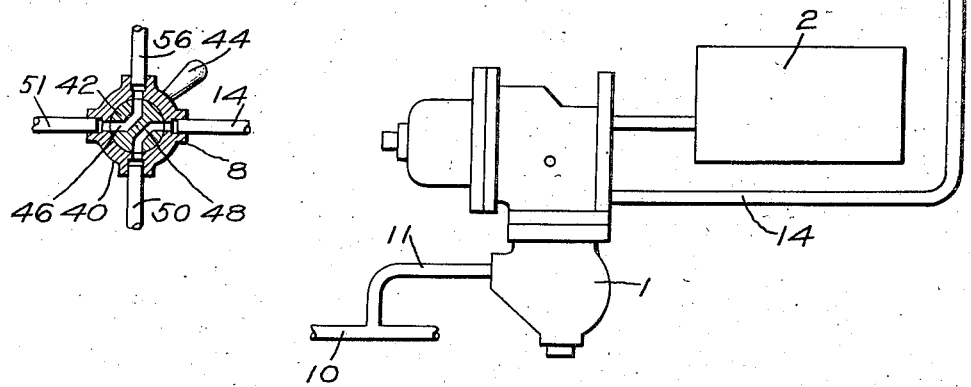

Fig. 2 is a fragmentary view showing the change-over valve employed in the equipment shown in Fig. 1 in the position for loaded car operation.

Referring to the drawing the brake equipment provided by this invention comprises a brake controlling valve device such as a triple valve device indicated generally by the reference character 1, an auxiliary reservoir 2, a brake cylinder 4, a differential valve device 6, a volume reservoir 7, and a change-over valve device 8.

The brake controlling valve device 1 may be of any well known construction and is connected to the brake pipe 10 by way of a branch pipe 11 and is operated in response to variations in the pressure of the fluid in the brake pipe to supply fluid under pressure from the brake pipe to the auxiliary reservoir 2, and also to supply fluid under pressure from the auxiliary reservoir 2 to and release fluid from a supply and release pipe 14, through which fluid under pressure is supplied to and released from the brake cylinder.

The differential valve device 6 comprises a casing constructed of a plurality of sections, including sections 15, 16 and 17. A movable abutment in the form of a diaphragm 20, which is clamped between the casing sections 15 and 16, is provided, and has secured thereto a stem 21, which is also secured to a movable abutment in the form of a diaphragm 24, which is clamped between the casing sections 16 and 17 and which is substantially larger in diameter than the diaphragm 20. One end 25 of the stem 21 is slidably mounted in a bore 26 in the casing section 15, while a relatively weak spring 27 is mounted in the chamber 32 on one side of the diaphragm 24 and urges the stem 21 to the right as viewed in Fig. 1 of the drawing, movement of the stem in this direction being limited by engagement of the end portion 25 of the stem with the bottom of the bore 26 in the casing section 15.

A slide valve 30 is positioned in the chamber 31 on one side of the diaphragm 20, and is slidable on a seat formed on the casing section 15.

The casing section 15 has a valve chamber 34 formed therein in which is mounted a ball valve element 35 which engages a seat surrounding a passage 36, while the chamber 34 is connected to a port in the seat of the slide valve 30 by way of a passage 38.

The change-over valve device 8 comprises a casing 40 having a bore therein in which is mounted a valve element 42 adapted to be operated by means of a handle 44.

The valve element 42 has a pair of angular passages 46 and 48 formed therein, and when the handle 44 is in the position in which it is shown in Fig. 1 of the drawing, which is the position to which it is moved to condition the apparatus for empty car operation, the passage 46 establishes communication between the pipe 50 leading to the brake cylinder 4 and a pipe 51, which is connected to a port in a seat of the slide valve 30 by way of a pipe and passage 52, to the passage 36 in the casing section 15 by way of a pipe 54, and to the chamber 32 on the spring side of the diaphragm 24. In this position of the handle 44 the passage 48 establishes communication between the pipe 14, which leads from the brake controlling valve device 1, and the pipe 56 which leads to the volume reservoir 7, and to the chamber 31 which contains the slide valve 30.

The chamber 33 intermediate the diaphragms 20 and 24 of the differential valve device 6 is constantly connected to the atmosphere by way of a passage 58.

In the operation of the equipment, assuming that the change-over valve device 8 is in the position shown in Fig. 1 of the drawing and that the brake controlling valve device 1 is in the release position so that the pipe 14 is connected to the atmosphere, the volume reservoir 7 and the chamber 31 will also be connected to the atmosphere, while the stem 21 of the differential valve device 6 will be held by the spring 27 in the position in which the end 25 of the stem 21 engages the bottom of the bore 26, which is the position in which it is shown in the drawing. When the stem 21 is in this position the slide valve 30 is in a position in which the passage 38 is opened, so as to connect the brake cylinder 4 to the atmosphere by way of the pipe 50, the passage 46 in the change-over valve device 8, the pipe 51, the pipe 54 and passage 36, past the check valve 35, thence by way of the passage 38 to the valve chamber 31, which is connected to the atmosphere by way of the reservoir 7, the pipe 56, the passage 48 in the change-over valve device 8, and the pipe 14 which leads to the brake controlling valve device 1.

In this position of the brake controlling valve device 1 fluid under pressure will be supplied from the brake pipe 10 to the auxiliary reservoir 2 to charge this reservoir in the well known manner.

On a reduction in the pressure of the fluid in the brake pipe 10 the brake controlling valve device 1 operates in the usual manner to cut off the release of fluid under pressure from the pipe 14 and to supply fluid under pressure from the auxiliary reservoir 2 to this pipe. The fluid which is supplied to the pipe 14 flows therethrough to the pipe 56 and through the reservoir 7 to the chamber 31.

The supply of fluid under pressure from the chamber 31 to the brake cylinder at this time is cut off as the slide valve 30 closes the passage 52, while the ball valve element 35 prevents the flow of fluid from the chamber 31 to the brake cylinder 4 by way of the passage 38.

The supply of fluid under pressure to the chamber 31 causes the pressure of the fluid in this chamber to increase, with the result that the force of the fluid under pressure in the chamber 31 acting on the diaphragm 20 causes the stem 21 to move to the left against the spring 27 and thereby move the slide valve 30 to a position in which the end of the passage 52 is uncovered. Fluid thereupon is permitted to flow from the chamber 31 by way of the passage and pipe 52 to the pipe 51, from which it flows by way of the passage 46 in the change-over valve 8 to the pipe 50 and thence to the brake cylinder 4.

Fluid which is supplied to the passage 52 also flows by way of the pipe 51 to the chamber 32 on the spring side of the diaphragm 24, and on an increase in the pressure of the fluid in this chamber to a predetermined value less than, but proportional to the pressure of the fluid in the chamber 31 the force exerted by the fluid acting on the large diaphragm 24 will overcome the force of the fluid in the chamber 31 acting on the small diaphragm 20, and the stem 21 thereupon will be moved to the right again so as to move the slide valve 30 to the position to lap the passage 52 and cut off the further flow of fluid from the chamber 31 to the passage 52.

On an increase in the pressure of the fluid supplied to the chamber 31 the force exerted by the fluid under pressure in this chamber acting on the small diaphragm 20 will exceed that of the fluid in the chamber 32 acting on the larger diaphragm 24, and the stem 21 will again be moved to the left so as to move the slide valve 30 to the position to uncover the passage 52 and again permit fluid to be supplied from the chamber 31 to the brake cylinder 4 and also to flow to the chamber 32.

On the resulting increase in the pressure of the fluid in the chamber 32 the force exerted by the fluid in this chamber and acting on the diaphragm 24 will increase so as to again exceed that of the fluid in the chamber 31 acting on the smaller diaphragm 20, and the stem 21 will again be moved to the right to move the slide valve 30 to a position to cut off the flow of fluid from the chamber 31 to the passage 52.

It will be seen that the differential valve device 6 operates to supply fluid under pressure to the brake cylinder 4 at a pressure which is proportional to but less than the pressure of the fluid supplied to the chamber 31 by operation of the brake controlling valve device 1, the relationship of these pressures being governed by the relative sizes of the diaphragms 20 and 24.

As the pressure of the fluid supplied to the brake cylinder 4 by the differential valve device 6 is less than the pressure of the fluid supplied to the differential valve device by operation of the brake controlling valve device 1, a smaller volume of fluid will be supplied to the brake cylinder 4 than is supplied by the brake controlling valve device 1, and the volume reservoir 7 is provided, and is of such volume that the fluid required to charge this reservoir on a full application of the brakes will be substantially equal to the difference between the volume of fluid usually supplied by the brake controlling valve device 1 on a full application of the brakes and the volume supplied to the brake cylinder 4 by operation of the differential valve device 6.

It will be seen, therefore, that the volume of air consumed during an application of the brakes when the equipment is conditioned for empty car operation will be substantially the same as that usually supplied by the brake controlling valve device 1, so that the normal operation of this device will not be interfered with.

On an increase in the pressure of the fluid in the brake pipe 10 the brake controlling valve device 1 is moved to the release position, in which position fluid is released from the pipe 14 to the atmosphere.

On the release of fluid from the pipe 14 fluid is also released from the chamber 31 by way of the reservoir 7 and the pipe 56, and on a reduction in the pressure of the fluid in the chamber 31, the stem 21 is moved by the pressure of the fluid in the chamber 32 acting on the diaphragm 24 and by the spring 27 to the position in which the end 25 of the stem 21 engages the bottom of the bore 26. When the stem 21 is moved to this position the slide valve 30 uncovers the passage 38 and fluid may thereupon flow from the brake cylinder 4 by way of the pipe 50, the passage 46 in the change-over valve device 8, the pipe 51, and the pipe 54 to the passage 36, where it unseats the ball valve 35 and flows to the valve chamber 34, from which it flows by way of the passage 38 to the chamber 31 and from this chamber to the atmosphere by way of the brake controlling valve device 1.

As the volume of air to be released is substantially the same as that ordinarily present in the brake cylinder on an application of the brakes the time required to effect a release of the brakes by operation of the brake controlling valve device I will not be affected.

In order to condition this equipment for loaded car operation the handle 44 of the change-over valve device 8 is turned from the position in which it is shown in Fig. 1 of the drawing, to the position in which it is shown in Fig. 2 of the drawing, and by this movement of the handle 44 the valve 42 is turned so as to cut off communication between the pipes 14 and 56, and so that the passage 48 establishes communication between the pipes 14 and 50, so that fluid under pressure may be supplied directly to and released from the brake cylinder 4 by operation of the brake controlling valve device I in the usual manner by way of the pipe 14, the passage 48, and the pipe 50.

When the handle 44 of the change-over valve device 8 is turned to this position the differential valve device 6 does not affect the operation of the equipment in any way.

As fluid is supplied to brake cylinder 4 at the full pressure of the fluid supplied by the brake controlling valve device I when the equipment is conditioned for loaded car operation, a higher pressure will be developed in the brake cylinder than when the equipment is conditioned for empty car operation, at which time the pressure of the fluid supplied to the brake cylinder is reduced by operation of the differential valve device 6.

While one embodiment of the improved empty and load brake equipment provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In an empty and load brake equipment, in combination, a brake pipe, a brake cylinder, a brake controlling valve device operated by variations in the pressure of the fluid in the brake pipe and controlling the supply of fluid from a reservoir to a passage through which fluid may be supplied to the brake cylinder, and valve means subject to the opposing pressures of the fluid supplied to said passage and of the fluid supplied to the brake cylinder and controlling communication through said passage.

2. In an empty and load brake equipment, in combination, a brake pipe, a brake cylinder, a brake controlling valve device operated by variations in the pressure of the fluid in the brake pipe and controlling the supply of fluid from the reservoir to a passage through which fluid may be supplied to the brake cylinder, valve means subject to the opposing pressures of the fluid supplied to said passage and of the fluid supplied to the brake cylinder and controlling communication through said passage, and a valve device operable in one position to establish communication between said brake controlling valve device and the brake cylinder by way of the said valve means, and operable in another position to establish communication from said brake controlling valve device directly to the brake cylinder.

3. In an empty and load brake equipment, in combination, a brake pipe, a brake cylinder, a brake controlling valve device operated by variations in the pressure of the fluid in the brake pipe and controlling the supply of fluid from the reservoir to a passage through which fluid may be supplied to the brake cylinder, valve means subject to the opposing pressures of the fluid supplied to said passage and of the fluid supplied to the brake cylinder and controlling communication through said passage, and a valve device operable in one position to establish communication between said brake controlling valve device and the brake cylinder by way of the said valve means, and operable in another position to establish communication from said brake controlling valve device to the brake cylinder independently of said valve means.

4. In an empty and load brake equipment, in combination, a brake pipe, a brake cylinder, a volume reservoir, a brake controlling valve device operated by variations in the pressure of the fluid in the brake pipe and controlling the supply of fluid from a reservoir to a passage through which fluid may be supplied to the brake cylinder and to said volume reservoir, and valve means subject to the opposing pressures of the fluid supplied to said passage and of the fluid supplied to the brake cylinder and controlling communication through said passage.

5. In an empty and load brake equipment, in combination, a brake pipe, a brake cylinder, a volume reservoir, a brake controlling valve device operated by variations in the pressure of the fluid in the brake pipe and controlling the supply of fluid from a reservoir to a passage through which fluid may be supplied to the brake cylinder and to said volume reservoir, valve means subject to the opposing pressures of the fluid supplied to said passage and of the fluid supplied to the brake cylinder and controlling communication through said passage, and a valve device operative in one position thereof to establish communication between said brake controlling valve device and the volume reservoir and the brake cylinder by way of said valve means, and operative in another position to establish communication between said brake controlling valve device and the brake cylinder by way of a passage which by-passes said valve means.

6. In an empty and load brake equipment, in combination, a brake pipe, a brake cylinder, a volume reservoir, a brake controlling valve device operated by variations in the pressure of the fluid in the brake pipe and controlling the supply of fluid from a reservoir to a passage through which fluid may be supplied to the brake cylinder and to said volume reservoir, valve means subject to the opposing pressures of the fluid supplied to said passage and of the fluid supplied to the brake cylinder and controlling communication through said passage, and a valve device operative in one position thereof to establish communication between said brake controlling valve device and the volume reservoir and the brake cylinder by way of said valve means, and operative in another position to establish communication between said brake controlling valve device and the brake cylinder by way of a passage which by-passes said valve means, and to cut off communication between said brake controlling valve device and said volume reservoir.

7. In an empty and load brake equipment, in combination, a brake pipe, a brake cylinder, a brake controlling valve device operated by variations in the pressure of the fluid in the brake pipe and controlling the supply of fluid to a passage through which fluid may be supplied to the brake cylinder, valve means controlling the supply of fluid from said passage to the brake cylinder, means for operating said valve means and comprising an abutment subject to the pressure of the fluid supplied to said passage, and an abutment subject to the pressure of the fluid supplied to the brake cylinder.

8. In an empty and load brake equipment, in combination, a brake pipe, a brake cylinder, a brake controlling valve device operated by variations in the pressure of the fluid in the brake pipe and controlling the supply of fluid to a passage through which fluid may be supplied to the brake cylinder, valve means controlling the supply of fluid from said passage to the brake cylinder, means for operating said valve means and comprising a member subject to the opposing forces of an abutment subject to the pressure of the fluid supplied to said passage, and an abutment subject to the pressure of the fluid supplied to the brake cylinder.

9. In an empty and load brake equipment, in combination, a brake pipe, a brake cylinder, a brake controlling valve device operated by variations in the pressure of the fluid in the brake pipe and controlling the supply of fluid to a passage through which fluid may be supplied to the brake cylinder, valve means controlling the supply of fluid from said passage to the brake cylinder, and means for operating said valve means, said means comprising a member subject to the opposing pressures of a movable abutment having a given area subject to the pressure of the fluid supplied to said passage, and a movable abutment having a different area subject to the pressure of the fluid supplied to the brake cylinder, whereby the pressure of the fluid supplied to the brake cylinder is varied in accordance with the pressure of the fluid supplied to said passage and is proportioned thereto as the area of the diaphragm subject to the fluid supplied to said passage is proportioned to the area of the diaphragm subject to the pressure of the fluid supplied to the brake cylinder.

10. In a fluid pressure brake equipment, in combination, a brake pipe, a brake cylinder, a differential valve device operated by an increase in the pressure of the fluid supplied thereto to supply fluid to the brake cylinder at a pressure proportional to the pressure of the fluid supplied to the said valve device, and a brake controlling valve device operated by variations in the pressure of the fluid in the brake pipe to supply fluid under pressure to the said differential valve device.

11. In a fluid pressure brake equipment, in combination, a brake pipe, a brake cylinder, a differential valve device operated by an increase in the pressure of the fluid supplied thereto to supply fluid to the brake cylinder at a pressure proportional to the pressure of the fluid supplied to the said valve device, a brake controlling valve device operated by variations in the pressure of the fluid in the brake pipe to supply fluid under pressure to a passage, and valve means operative in one position to establish communication between said passage and the differential valve device, and operative in another position to establish communication between said passage and the brake cylinder by way of a passage which by-passes the said differential valve device.

12. In a fluid pressure brake equipment, in combination, a brake pipe, a brake cylinder, a volume reservoir, a differential valve device operated by an increase in the pressure of the fluid supplied thereto to supply fluid to the brake cylinder at a pressure proportional to the pressure of the fluid supplied to the said valve device, a brake controlling valve device operative by variations in the pressure of the fluid in the brake pipe to supply fluid under pressure to a passage, and valve means operative in one position to establish communication between the said passage and the differential valve device and the volume reservoir, and operative in another position to establish communication between said passage and the brake cylinder and to cut off communication between said passage and the differential valve device and the volume reservoir.

13. In an empty and load brake equipment, in combination, a brake cylinder, a brake controlling valve device operative to supply fluid under pressure to the brake cylinder, valve means for controlling communication through which said valve device supplies fluid under pressure to the brake cylinder, and movable abutment means subject to the opposing pressures of the brake cylinder and the pressure of fluid supplied by said valve device for operating said valve means and adapted upon an increase in brake cylinder pressure to a degree less than the pressure of fluid supplied by said valve device to operate said valve means to close said communication.

14. In an empty and load brake equipment, in combination, a brake controlling valve device operative to supply fluid under pressure to the brake cylinder, valve means for controlling communication through which said valve device supplies fluid under pressure to the brake cylinder, and movable abutment means having differential areas subject to the opposing pressures of the brake cylinder and the pressure of the fluid supplied by said valve device for operating said valve means and adapted upon an increase in brake cylinder pressure to a degree less than the pressure of the fluid supplied by said valve device, to operate said valve means to close said communication.

15. In an empty and load brake equipment, in combination, a brake controlling valve device operative to supply fluid under pressure to the brake cylinder, valve means for controlling communication through which said valve device supplies fluid under pressure to the brake cylinder, and movable abutment means having differential areas subject to the opposing pressures of the brake cylinder and the pressure of the fluid supplied by said valve device for operating said valve means and operated by an increase in the pressure of the fluid supplied by said valve device to actuate said valve means to open said communication and upon an increase in brake cylinder pressure to a degree less than the pressure of the fluid supplied by said valve device to actuate said valve means to close said communication.

GLENN T. McCLURE.